United States Patent
Hu et al.

(10) Patent No.: US 8,834,728 B1
(45) Date of Patent: Sep. 16, 2014

(54) METHOD AND SYSTEM FOR PROVIDING AN ENERGY ASSISTED MAGNETIC RECORDING WRITER HAVING A SELF ALIGNED HEAT SINK AND NFT

(75) Inventors: Yufeng Hu, Fremont, CA (US); Shawn M. Tanner, San Jose, CA (US); Ut Tran, San Jose, CA (US); Zhongyan Wang, San Ramon, CA (US); Mirzafer Abatchev, Boise, ID (US)

(73) Assignee: Western Digital (Fremont), LLC, Fremont, CA (US)

( * ) Notice: Subject to any disclaimer, the term of this patent is extended or adjusted under 35 U.S.C. 154(b) by 191 days.

(21) Appl. No.: 13/045,394

(22) Filed: Mar. 10, 2011

(51) Int. Cl.
B44C 1/22 (2006.01)
H01B 13/00 (2006.01)
G11B 7/1387 (2012.01)
G11B 5/48 (2006.01)

(52) U.S. Cl.
CPC ............ *G11B 5/4866* (2013.01); *G11B 7/1387* (2013.01)
USPC .............................................. 216/22; 216/17

(58) Field of Classification Search
CPC ............... G11B 5/4866; G11B 7/1387; G11B 7/24059; G11B 2005/0005
USPC ........ 216/22, 17; 360/13, 59; 369/13; 29/603
See application file for complete search history.

(56) References Cited

U.S. PATENT DOCUMENTS

| 4,106,975 | A | 8/1978 | Berkenblit et al. |
| 4,667,395 | A | 5/1987 | Ahlgren et al. |
| 5,940,697 | A | 8/1999 | Yoo et al. |
| 5,994,747 | A | 11/1999 | Wu |
| 6,746,877 | B1 | 6/2004 | Hornik et al. |
| 6,795,630 | B2 | 9/2004 | Challener et al. |
| 7,272,079 | B2 | 9/2007 | Challener |
| 7,500,255 | B2 | 3/2009 | Seigler et al. |
| 7,791,839 | B2 | 9/2010 | Olson et al. |
| 7,965,464 | B2 | 6/2011 | Batra et al. |
| 8,024,748 | B1 | 9/2011 | Moravec et al. |
| 8,134,794 | B1 | 3/2012 | Wang |
| 8,164,855 | B1 | 4/2012 | Gibbons et al. |
| 8,248,891 | B2 | 8/2012 | Lee et al. |
| 8,286,329 | B1 | 10/2012 | Zhao et al. |
| 8,307,540 | B1 | 11/2012 | Tran et al. |
| 8,310,901 | B1 | 11/2012 | Batra et al. |
| 8,375,565 | B2 | 2/2013 | Hu et al. |
| 8,391,108 | B2 | 3/2013 | Peng et al. |

(Continued)

OTHER PUBLICATIONS

Zhongyan Wang, et al., "An approach for nanometer trench and hole formation", Optical Microlithography XXI, Proceedings of the SPIE, vol. 6924, pp. 692447-692447-8 (2008).

*Primary Examiner* — Duy Deo
*Assistant Examiner* — Mahmoud Dahimene

(57) ABSTRACT

A method provides an EAMR transducer. The EAMR transducer is coupled with a laser and has an ABS configured to reside in proximity to a media during use. The method includes providing an NFT using an NFT mask. The NFT resides proximate to the ABS and focuses the laser energy onto the media. A portion of the NFT mask is removed, forming a heat sink mask covering part of the NFT. Optical material(s) are deposited, covering the heat sink mask and the NFT. The heat sink mask is removed, providing an aperture in the optical material(s). A heat sink corresponding to the aperture is provided. The heat sink bottom is thermally coupled with the NFT. A write pole for writing to the media and coil(s) for energizing the write pole are provided. The write pole has a bottom surface thermally coupled with the top surface of the heat sink.

18 Claims, 15 Drawing Sheets

(56) References Cited

U.S. PATENT DOCUMENTS

| | | |
|---|---|---|
| 8,416,530 B2 | 4/2013 | Gao et al. |
| 8,456,969 B1 | 6/2013 | Mooney et al. |
| 8,486,286 B1 | 7/2013 | Gao et al. |
| 2003/0137772 A1 | 7/2003 | Challener |
| 2008/0068748 A1 | 3/2008 | Olson et al. |
| 2010/0104768 A1 | 4/2010 | Xiao et al. |
| 2010/0123965 A1 | 5/2010 | Lee et al. |
| 2010/0123967 A1 | 5/2010 | Batra et al. |
| 2010/0214685 A1 | 8/2010 | Seigler et al. |
| 2011/0090588 A1 | 4/2011 | Gao et al. |

METHOD AND SYSTEM FOR PROVIDING AN ENERGY ASSISTED MAGNETIC RECORDING WRITER HAVING A SELF ALIGNED HEAT SINK AND NFT

BACKGROUND

FIG. 1 depicts top and side views of a portion of a conventional energy assisted magnetic recording (EAMR) transducer 10. For clarity, FIG. 1 is not to scale. The conventional EAMR transducer 10 is used in writing a recording media (not shown in FIG. 1) and receives light, or energy, from a conventional laser (not shown in FIG. 1). The conventional EAMR transducer 10 includes a conventional waveguide 12 having cladding 14 and 16 and core 18, a conventional grating 20, a conventional near-field transducer (NFT) 22, and a conventional pole 30. Light from a laser (not shown) is incident on the grating 20, which coupled light to the waveguide 12. Light is guided by the conventional waveguide 12 to the NFT 22 near the air-bearing surface (ABS). The NFT 22 focuses the light to magnetic recording media (not shown), such as a disk.

In operation, light from the laser is coupled to the conventional EAMR transducer 10 using the grating 20. The waveguide 12 directs light from the grating 12 to the NFT 22. The NFT 22 focuses the light from the waveguide 12 and heats a small region of the conventional media (not shown). The conventional EAMR transducer 10 magnetically writes data to the heated region of the recording media by energizing the conventional pole 30.

Although the conventional EAMR transducer 10 may function, there are drawbacks. At current high recording densities, performance of the EAMR transducer 10 may degrade. In particular, the NFT 22 may absorb a significant amount of heat during operation. As a result, the conventional NFT 22 may degrade. In some instances, the conventional NFT 22 may be destroyed during use. Consequently, a mechanism for dissipating heat without adversely affecting performance and reliability of the EAMR head may be desired.

Accordingly, what is needed is a system and method for improving performance and reliability of an EAMR transducer.

BRIEF SUMMARY OF THE INVENTION

A method provides an EAMR transducer. The EAMR transducer is coupled with a laser for providing energy and has an air-bearing surface (ABS) configured to reside in proximity to a media during use. The method includes providing a near field transducer (NFT) using an NFT mask. The NFT resides proximate to the ABS and is for focusing the energy onto the region of the media. The method also includes removing a portion of the NFT mask to form a heat sink mask covering at least a first portion of the NFT. Optical material(s) are deposited, covering the heat sink mask and the NFT. The heat sink mask is removed, thereby providing an aperture in the optical material(s) and exposing a second portion of the NFT. A heat sink corresponding to the aperture is provided. The heat sink has a top surface and a bottom thermally coupled with the disk portion of the NFT. The method also includes providing a write pole configured to write to a region of the media and providing coil(s) for energizing the write pole. The write pole has a bottom surface, a portion of which is thermally coupled with the top surface of the heat sink.

DETAILED DESCRIPTION OF THE EMBODIMENTS OF THE INVENTION

Figure 1:
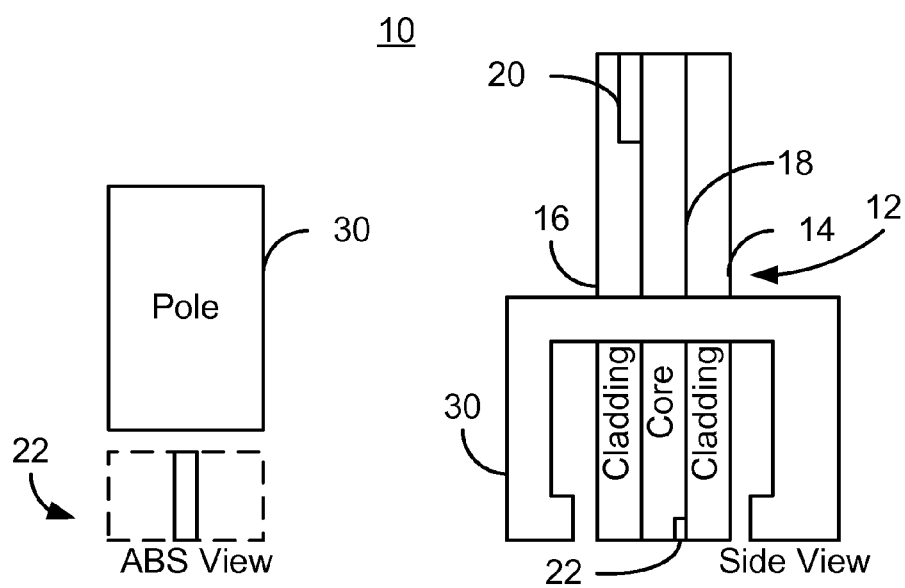
FIG. 1 is a diagram depicting a conventional EAMR transducer.
Figure 2:
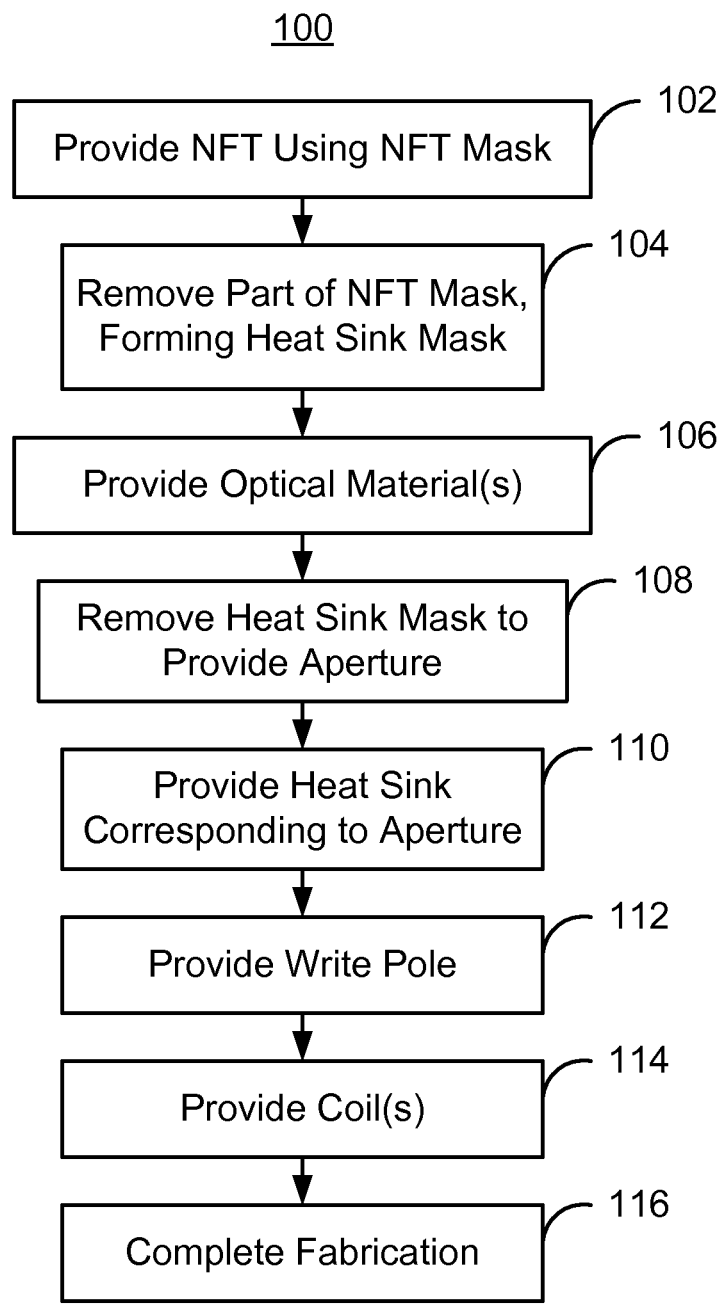
FIG. 2 is a flow chart depicting an exemplary embodiment of a method for fabricating an EAMR transducer including a self-aligned heat sink.

FIG. 2 is a flow chart depicting an exemplary embodiment of a method 100 for fabricating an EAMR transducer having a self-aligned heat sink. For simplicity, some steps may be omitted, interleaved, and/or combined. The EAMR transducer being fabricated may be part of a merged head that also includes a read head (not shown) and resides on a slider (not shown) in a disk drive. The method 100 is also described in the context of providing a single EAMR transducer. However, the method 100 may be used to fabricate multiple transducers at substantially the same time. The method 100 and system are also described in the context of particular layers. However, in some embodiments, such layers may include multiple sub-layers. The method 100 also may commence after formation of other portions of the EAMR transducer. In one embodiment, the method 100 commences after formation of portions of the waveguide, such as a core. Thus, a flat surface for formation of subsequent structures has been provided.

An NFT, which is used focusing the laser energy onto the region of the media to be written, is provided using an NFT mask, via step 102. The NFT mask has two portions—a disk mask and a pin mask. The pin mask has a width, as viewed from the ABS, that is significantly less than the disk mask. The pin mask is between the disk mask and the ABS. In some embodiments, the disk mask has a circular cross-section, or footprint. However, in other embodiments, the disk mask may have another shape. Step 102 includes depositing the material(s) for the NFT, providing a mask having the desired shape (e.g. disk and pin masks), and removing the exposed portion of the NFT material. The NFT is conductive and, in some embodiments, includes Au. The mask may be a hard mask, such as SiC or amorphous carbon (a-C). In other embodiments, the NFT mask may include different or additional materials.

A portion of the NFT mask is removed to form a heat sink mask, via step 104. The heat sink mask covers part of the NFT. Step 104 may be seen as shrinking the NFT mask to provide the heat sink mask. In some embodiments, step 104 includes performing an isotropic removal process, such as an isotropic RIE during which the NFT mask remains uncovered. Thus, the NFT mask is removed both vertically and horizontally. In some embodiments, the same amount of material is removed vertically as horizontally. As a result, the pin mask of the NFT mask may be completely removed. Only part of the disk mask of the NFT mask remains to form the heat sink mask. In such embodiments, the heat sink mask resides only the disk portion of the NFT. Further, the heat sink mask may have the same shape cross section as the NFT. For example, if the disk portion of the NFT is a disk (i.e. has a circular footprint), the heat sink mask may also be a disk. Finally, the removal of the portion of the NFT mask in step 104 is desired to leave the underlying NFT substantially undamaged.

Optical material(s) are provided, via step 106. These optical material(s) cover the heat sink mask and the NFT. Step 106 may include depositing material(s) such as aluminum oxide and/or silicon dioxide. In some embodiments, the optical material(s) deposited in step 106 may be used as cladding for the waveguide.

The heat sink mask is removed, via step 108. Step 108 may include removing a portion of the optical material(s) covering the mask. For example, a hard mask such as a-C and/or SiC may be provided. A planarization step, such as a chemical mechanical planarization (CMP) would then be performed. The heat sink mask may then be removed using a process appropriate for the material used in the heat sink mask. The process is, however, desired to leave the NFT substantially undamaged. Further, in some embodiments, the hard mask may remain. In such embodiments, the heat sink mask/NFT mask and hard mask are formed from different materials. As a result, an aperture is provided in the optical material(s) and a portion of the NFT exposed.

A heat sink corresponding to the aperture is provided, via step 110. The heat sink has a top surface and a bottom thermally coupled with the disk portion of the NFT. In some embodiments, step 110 may include blanket depositing the heat sink material(s), such as Au and/or Cu. Step 110 would also include removing excess portions of the heat sink material(s) external to the aperture. This removal process may be performed via planarization such as a CMP, a high angle ion mill, some combination of these processes, or in another manner. In addition, portions of the heat sink material may be removed to provide a sloped top surface. In other embodiments, another mechanism for providing the desired shape of the heat sink may be used. This top surface may form an angle with to the ABS. Such an angle may be greater than zero and less than ninety degrees. In some embodiments, a portion of the heat sink proximate to the ABS may be removed such that the heat sink has a "D"-shaped cross-section, rather than a circular cross-section.

A write pole configured to write to a region of the media heated by the laser energy is provided, via step 112. The write pole has a bottom surface, a portion of which is thermally coupled with the top surface of the heat sink. One or more write coils may also be provided for energizing the write pole, via step 114. Fabrication of the EAMR head may then be completed, via step 116.

Figure 3:
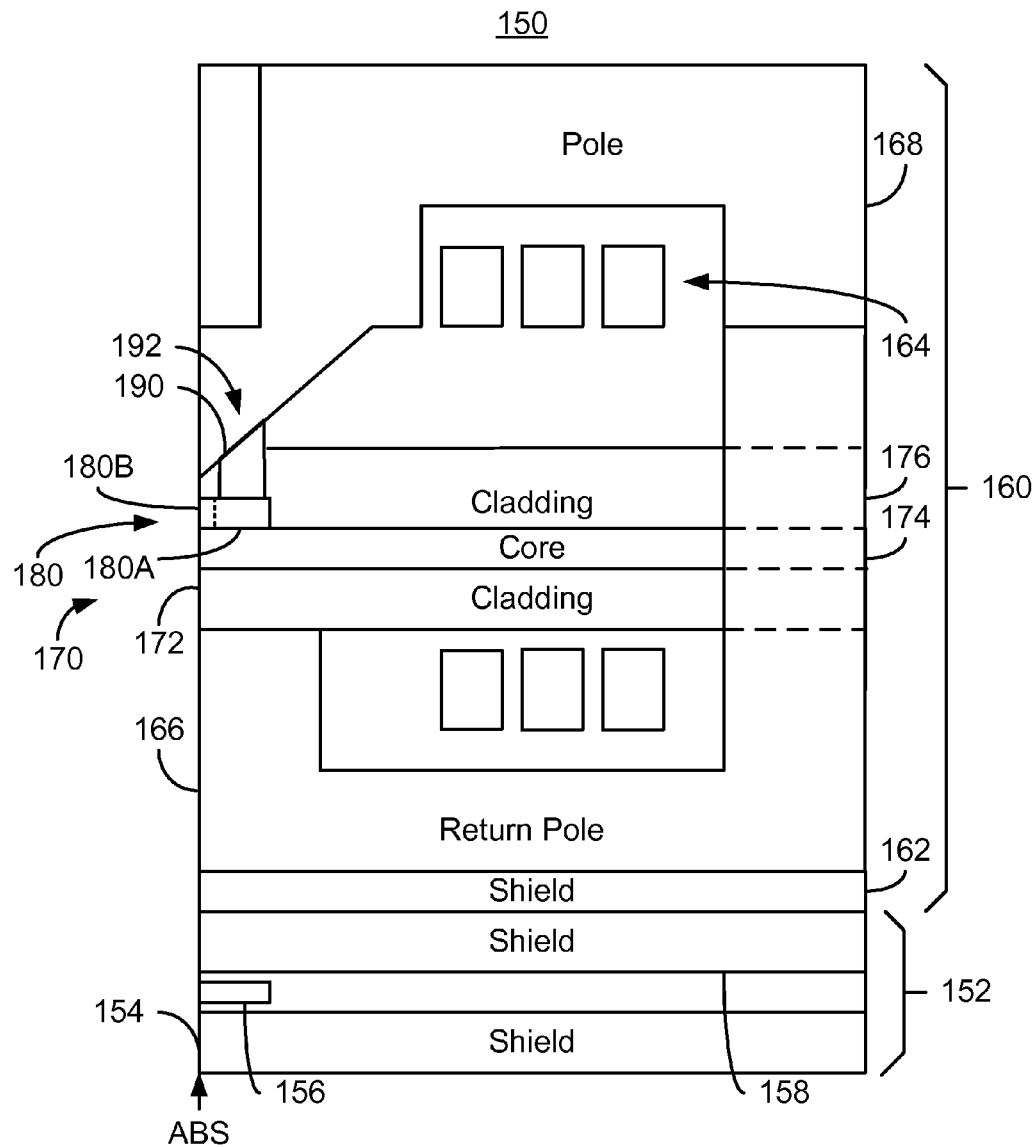
FIG. 3 is a diagram depicting an exemplary embodiment of an EAMR head.

Thus, an EAMR transducer including a heat sink thermally coupling the NFT and the pole may be provided. Further, the pole may have a sloped bottom surface. For example, FIG. 3 depicts one embodiment of an EAMR head 150 fabricated using the method 100. For clarity, FIG. 3 is not to scale. For simplicity not all portions of the EAMR head 150 are shown. In addition, although the EAMR head 150 is depicted in the context of particular components other and/or different components may be used. Further, the arrangement of components may vary in different embodiments. The EAMR head 150 may be used in an EAMR disk drive. The EAMR head 150 includes a read transducer 152 and a write transducer 160. The read transducer 152 includes shields 154 and 158 and reader sensor 156. In some embodiment, the read sensor 156 may be a giant magnetoresistance sensor, such as a spin tunneling junction. However, in other embodiments, another sensor may be used.

The EAMR transducer 160 includes waveguide 170, NFT 180, write pole 168, return pole 166, coil(s) 164, and shield 162. The EAMR transducer 160 may also include a grating (not shown) that is used to couple light from the laser (not shown) to the waveguide 170. The coil(s) 164 may be used to energize the write pole 140 during writing. In the embodiment shown, the shield 162 is depicted as separate from the return pole 166. However, in another embodiment, these components may be combined. Further, the waveguide 170 is shown as residing between the pole 168 and return pole 166. In another embodiment, the pole 168 may be between the waveguide and the return pole 166.

The waveguide 170 directs energy from the laser to the ABS and more specifically to the NFT 180. The waveguide 170 includes cladding 172 and 176 as well as core 174. The NFT 180 is optically coupled with the waveguide 170, receiving energy from the core 174. The NFT 180 is proximate to the ABS. For example, the NFT 180 is shown as having a surface occupying a portion of the ABS. The NFT 180 focuses energy from the waveguide 170 onto a region of the media (not shown). In some embodiments, the NFT 180 includes a disk 180A and a pin 180B. The pin 180B is between the disk 180A and the ABS. Thus, the disk 180A is recessed from the ABS and thus is shown by a dashed line in the ABS view of FIG. 3. The disk 180A extends further in the track width direction (perpendicular to the plane of the page in FIG. 3) than the pin 180B. Although termed a disk, the disk 180A of the NFT 180 need not be disk-shaped. For example, instead of having a circular cross-sectional shape, the disk 180A may be square, rectangular, or have another shape.

The write pole 168 is configured to write to the region of the media heated by the NFT 180. In the embodiment shown, a portion of the bottom surface of the pole 168 proximate to the ABS is not parallel to the top surface of the NFT 180. In some embodiments, this portion of the bottom surface of the pole 168 may be configured to be parallel to the top surface of the NFT.

The heat sink 190 is thermally coupled at its bottom with the NFT 180 and at its top with the bottom surface of the pole 168. The heat sink 190 has a top surface 192 that is sloped. In general, the width of the heat sink is smaller than that of the NFT 180. Further, because of the method 100 used, the heat sink 190 is self aligned to the NFT 180.

Using the method 100, the heat sink 190 can be provided in the EAMR transducer 150. The heat sink 190 allows for heat to be carried away from the NFT 180. The method 100 also provides the heat sink 190 without damaging the NFT 180. Further, the heat sink mask is formed from the mask used in defining the NFT 180. As a result, the heat sink 190 is self aligned to the disk portion 180A of the NFT 180. Misalignments between the heat sink 190 and the NFT 180 may be reduced or eliminated. Thus, the heat sink 190 is able to transport heat from the NFT 180. Consequently, performance and reliability of the NFT 180 may be improved. Because the heat sink 180 and thus the pole 190 may be sloped, a separation between the magnetic and optical components may be maintained. Thus, performance and reliability of the EAMR transducer 150 may be enhanced.

Figure 4:
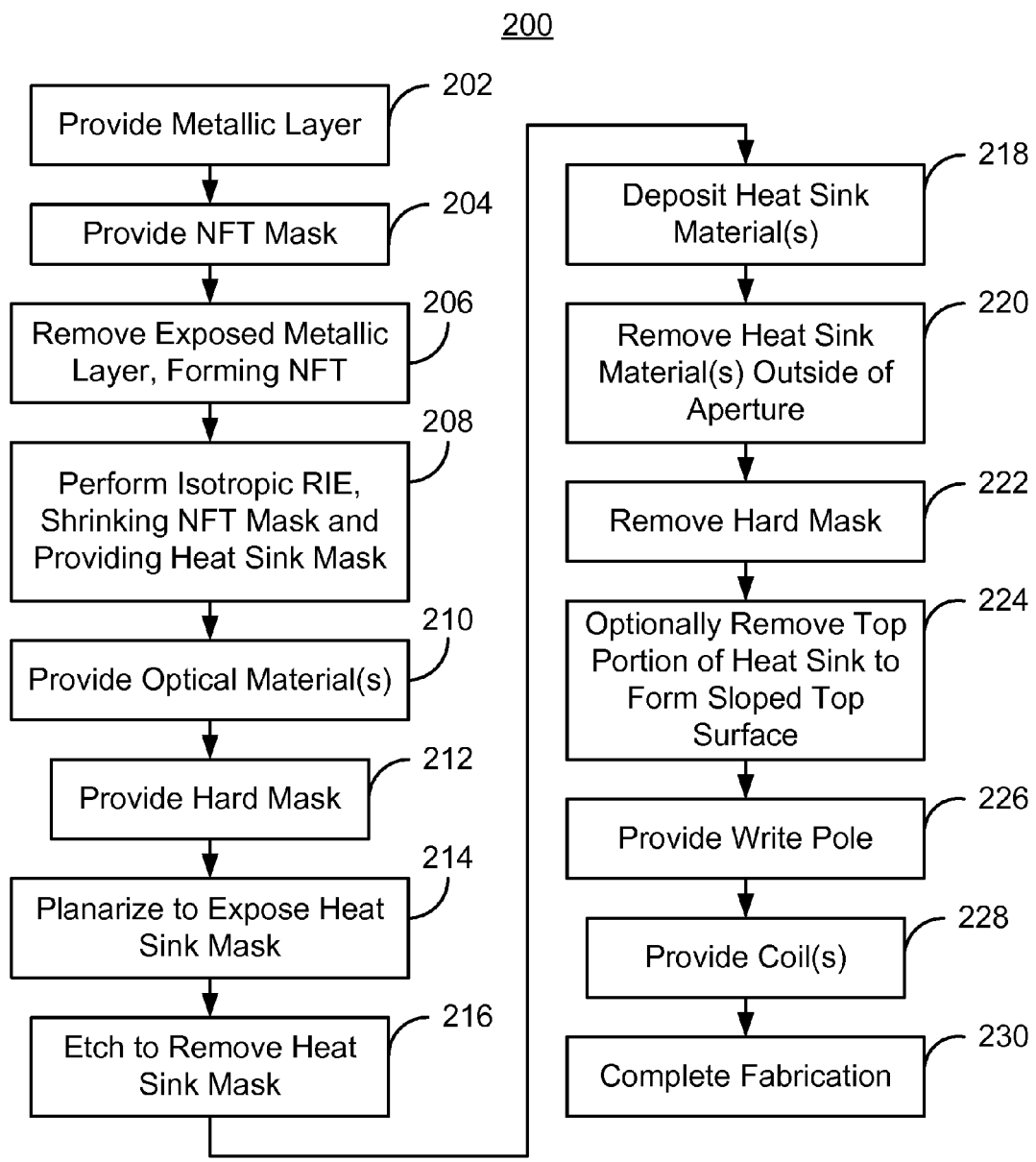
FIG. 4 is a flow chart depicting an exemplary embodiment of a method for providing a self-aligned heat sink in an EAMR transducer.

FIG. 4 is a flow chart depicting an exemplary embodiment of a method 200 for fabricating an EAMR transducer having a self-aligned heat sink. For simplicity, some steps may be omitted, interleaved and/or combined. FIGS. 5-15 are diagrams depicting side and top views of an exemplary embodiment of a portion of an EAMR transducer during 250 fabrication. For clarity, FIGS. 5-15 are not to scale. Further, although FIGS. 5-15 depict the ABS location (location at which the ABS is to be formed) and ABS at a particular point in the pole, other embodiments may have other locations for the ABS. Referring to FIGS. 4-15, the method 200 is described in the context of the EAMR transducer 250. However, the method 200 may be used to form another device (not shown). The EAMR transducer 250 being fabricated may be part of a merged head that also includes a read head (not shown in FIGS. 5-15), a laser (not shown in FIGS. 5-15) and resides on a slider (not shown) in a disk drive. In addition, other portions of the EAMR transducer 250, such as the pole(s), shield(s), coil(s), and remaining optics are not shown. The method 200 also may commence after formation of other portions of the EAMR transducer 250. The method 200 is also described in the context of providing a single EAMR transducer 250 and a single heat sink in the EAMR transducer 250. However, the method 200 may be used to fabricate multiple transducers and/or multiple heat sinks per transducer at substantially the same time. The method 200 and device 250 are also described in the context of particular layers. However, in some embodiments, such layers may include multiple sublayers.

Figure 5:
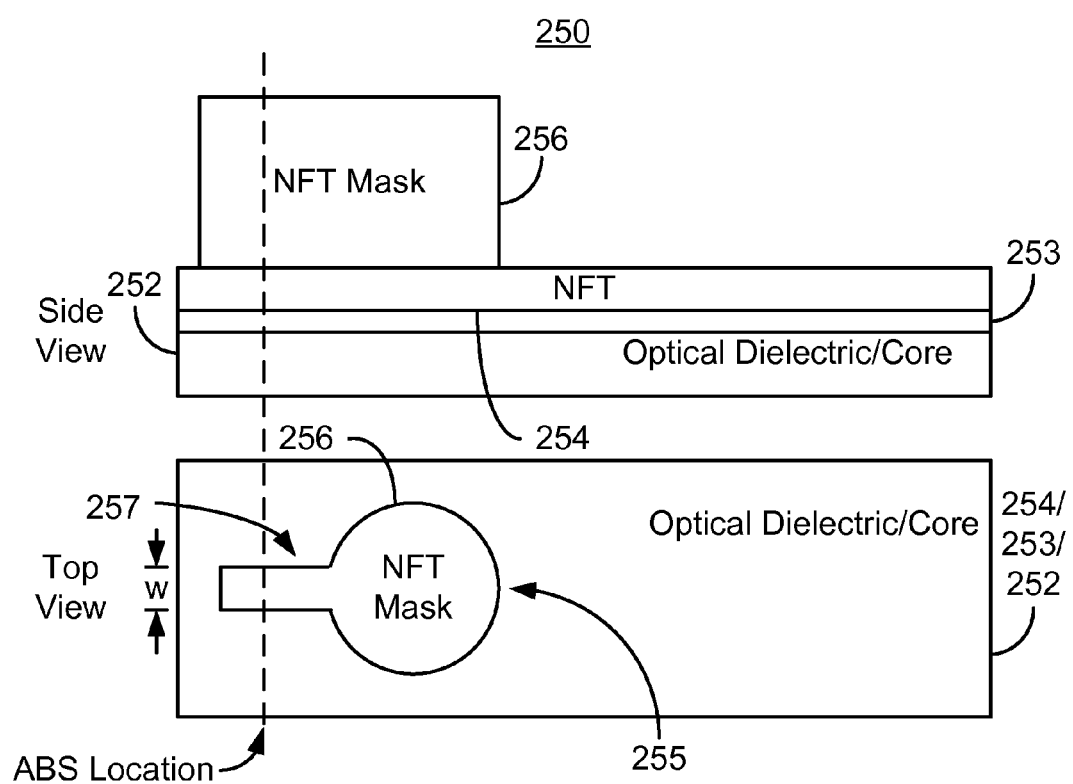
FIGS. 5-15 are diagrams depicting an exemplary embodiment of a magnetic recording transducer during fabrication.

The material(s) for the NFT are provided, via step 202. Step 202 may include depositing a layer of conductive material(s) such as Au. An NFT mask used in defining the NFT is provided, via step 204. Step 204 may include depositing and patterning a hard mask material that can be removed from the NFT without undue damage to the NFT. In some embodiments, SiC and/or a-C are provided in step 204. Photolithography may then be used in patterning the SiC or a-C. FIG. 5 depicts the EAMR transducer 250 after step 204 is performed. Thus, optical dielectric/core 252, an optional spacer layer 253, and NFT material(s) 254 are shown. The optional spacer layer 253 may be formed of the same materials as the cladding. For example, an optical dielectric such as aluminum oxide may be used. Also shown is the NFT mask 256, which may include SiC and/or a-C. The NFT mask 256 includes a disk mask 255 and a pin mask 257. The pin mask 257 may be thin, For example, the pin mask may have a width, w, of not more than 30-50 nm.

Figure 6:
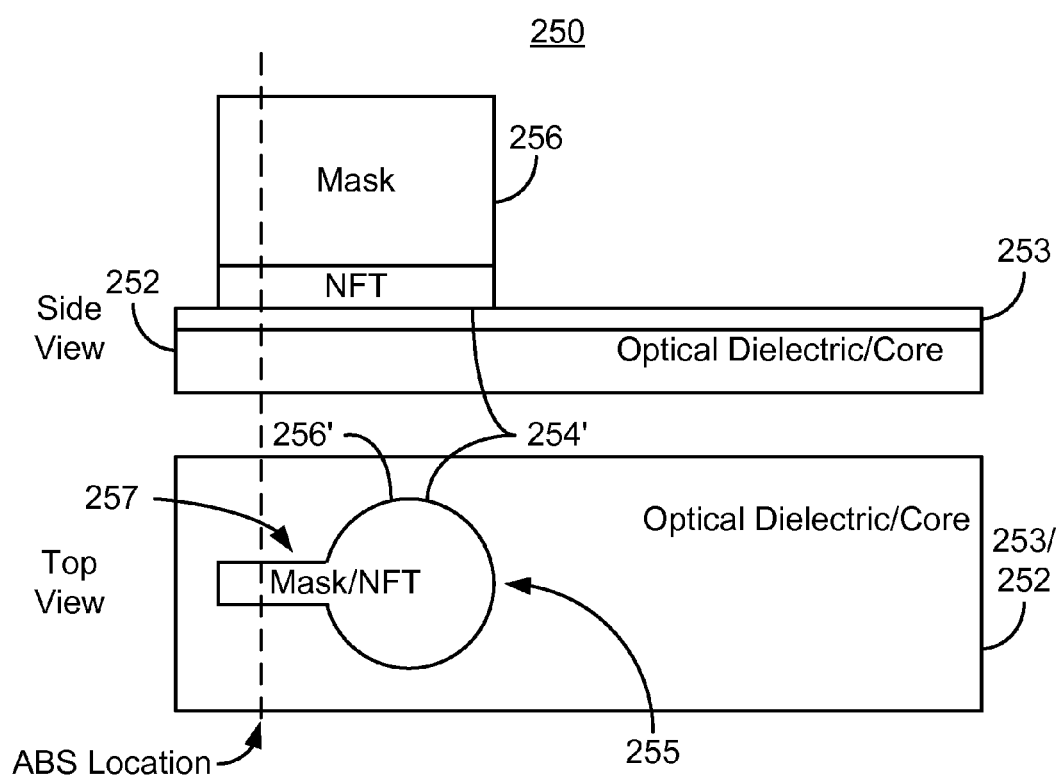
Figure 7:
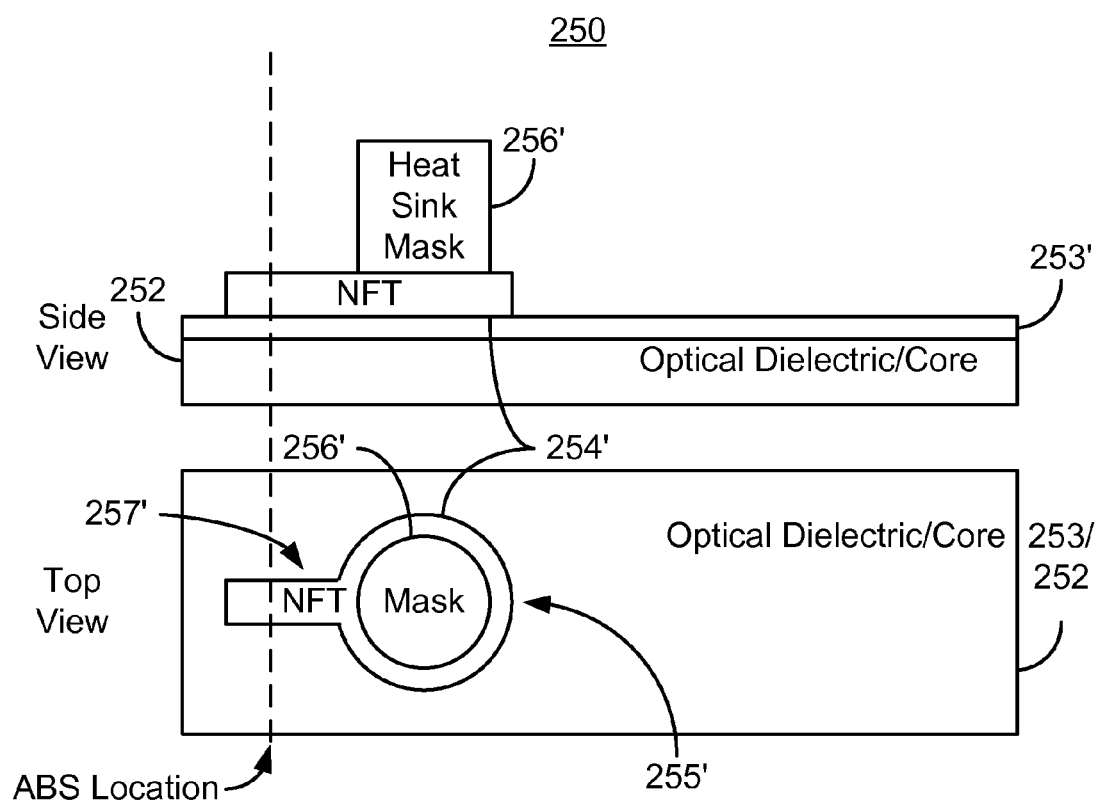

The exposed portion of the metallic layer is removed to form the NFT, via step 206. Step 206 may include ion milling the exposed metallic material(s). Thus, the pattern of the NFT mask 256 is transferred to the metallic materials 254. FIG. 6 depicts the transducer 250 after step 206 is performed. Thus, the NFT 254' has been formed from the NFT material(s). An isotropic RIE is then performed, via step 208. Thus, the NFT mask 256 is shrunk. FIG. 7 depicts the transducer 250 after step 208 is completed. Because it is thin, the pin mask of the NFT mask 256 has been removed and the disk mask of the NFT mask 256 reduced in diameter. Thus, heat sink mask 256' is formed. However, the pin portion 257' and disk portion 255' of the NFT 254' remain substantially undamaged.

Figure 8:
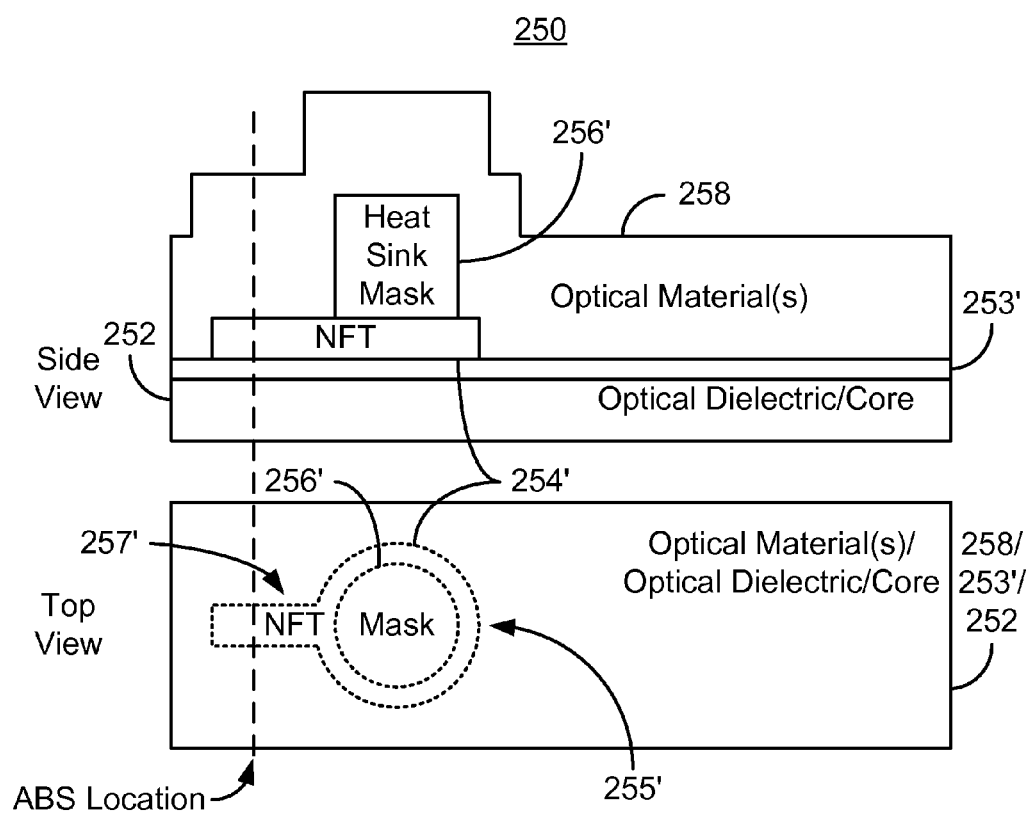

Optical material(s) are provided, via step 210. In some embodiments, step 210 includes depositing a layer of aluminum oxide. FIG. 8 depicts the transducer 250 after step 210 is performed. Thus, optical material(s) 258 are shown. The optical material(s) 258 cover both the NFT 256' and the heat sink mask 256'.

Figure 9:
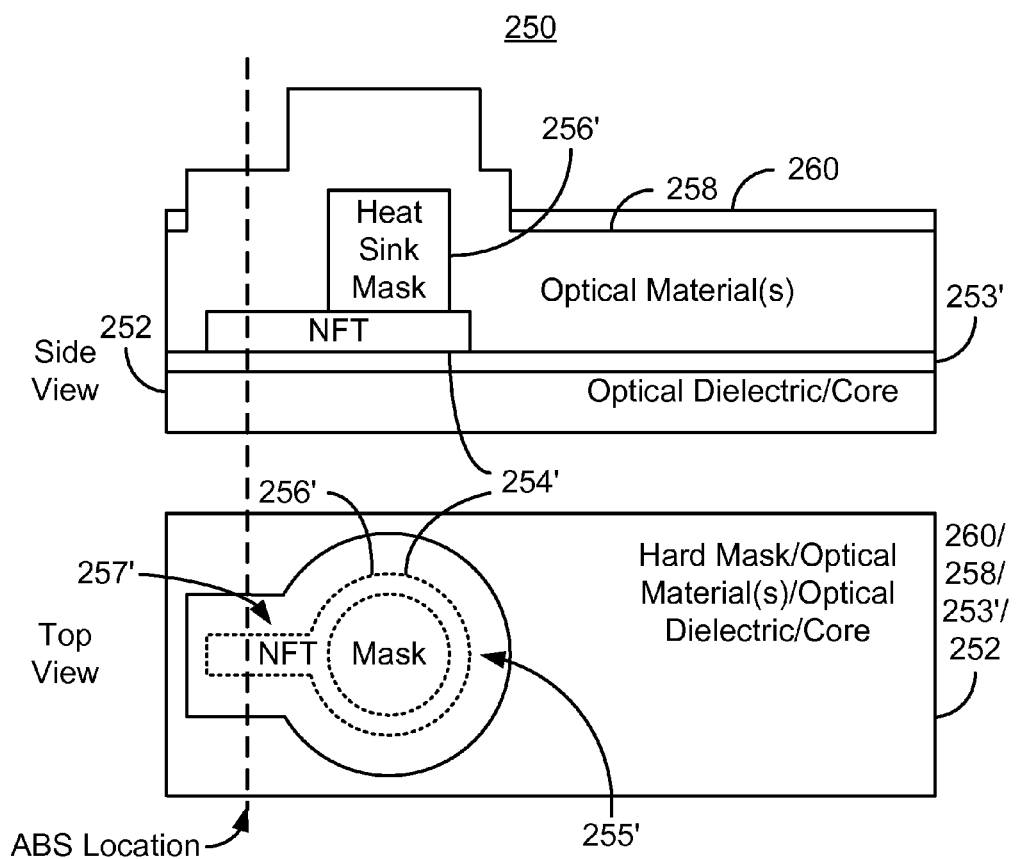

A hard mask is provided, via step 212. In some embodiments, step 212 includes providing a photoresist mask corresponding to the NFT, depositing the hard mask layer, and lifting-off the photoresist mask. FIG. 9 depicts the transducer 250 after step 212 is performed. Thus, a hard mask 260 is provided. The hard mask 260 may include material(s) such as a-C and/or SiC. However, the hard mask 260 is desired to be made of different material(s) than the heat sink mask 256'. For example, if the heat sink mask 256' is composed of a-C, then the hard mask 260 may be SiC.

Figure 10:
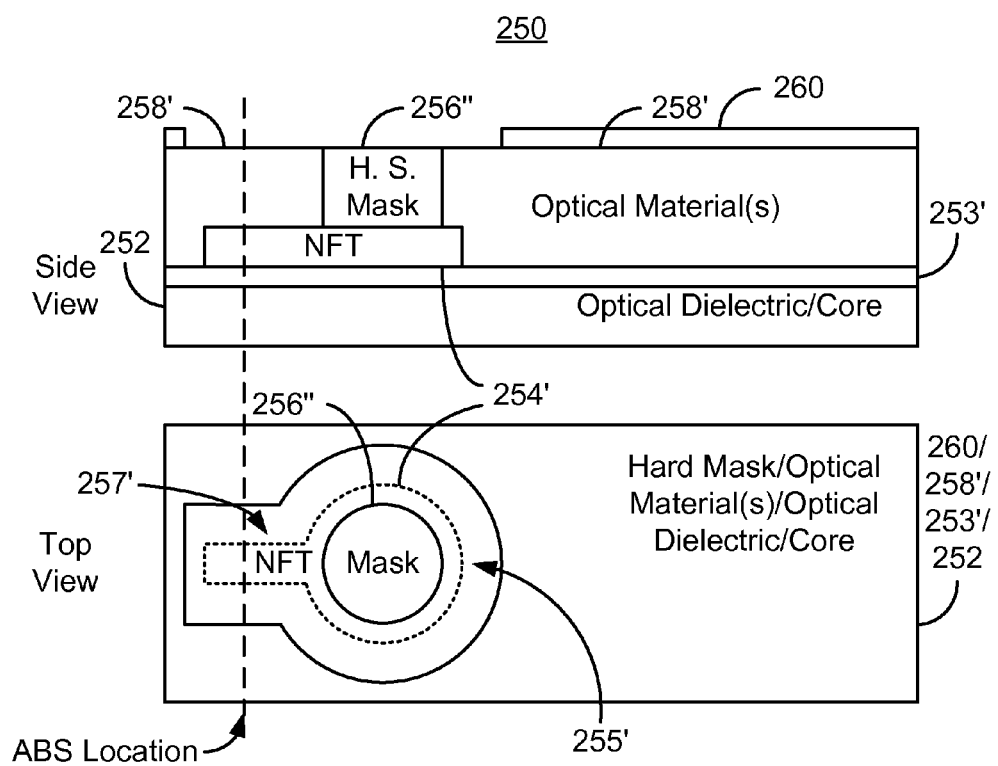

The heat sink mask 256' is exposed, via step 214. In some embodiments, step 214 includes performing a planarization, such as a CMP. FIG. 10 depicts the transducer 250 after step 214 is performed. Thus, a portion of the optical material(s) 258' is shown and the heat sink mask 256" is exposed.

Figure 11:
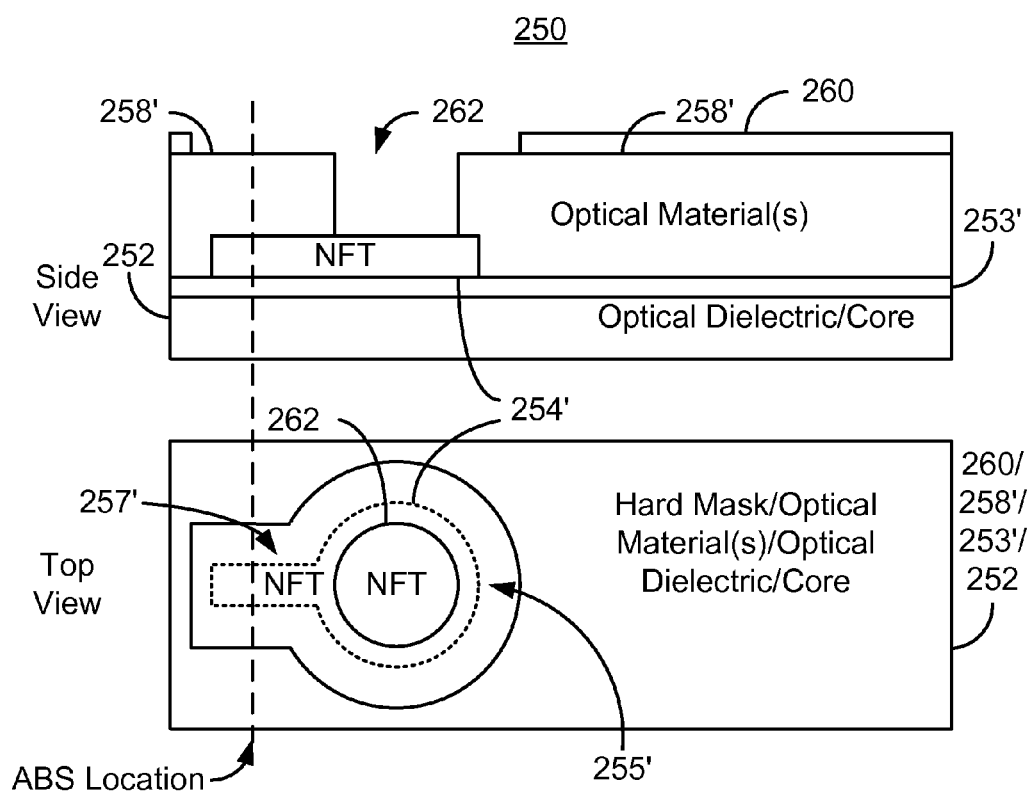

The heat sink mask 256' is removed, via step 216. An etch appropriate to the heat sink mask 256' is used in step 216. For example, an RIE may be used for a-C or SiC used in the mask 256'. FIG. 11 depicts the transducer 250 after step 216 is performed. Thus, aperture 262 is formed in the location at which the heat sink mask 256' previously resided. A portion of the NFT 254' is exposed. However, the NFT 254' remains substantially undamaged.

Figure 12:
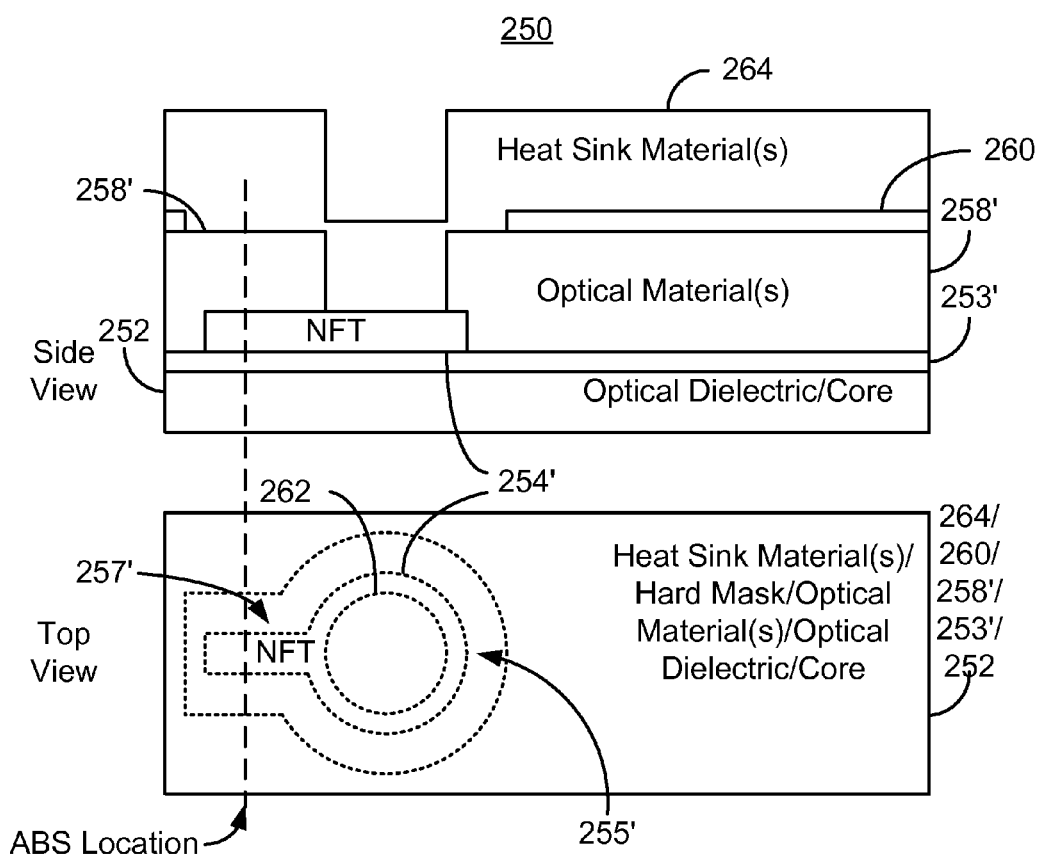

Material(s) for the heat sink are deposited, via step 218. Step 218 includes depositing high thermal conductivity materials such as Au and/or Cu. In other embodiments, other high thermal conductivity material(s), including those other than metals, may be used. FIG. 12 depicts the EAMR transducer 250 after this step is performed. Thus, heat sink material(s) 264 are shown.

Figure 13:
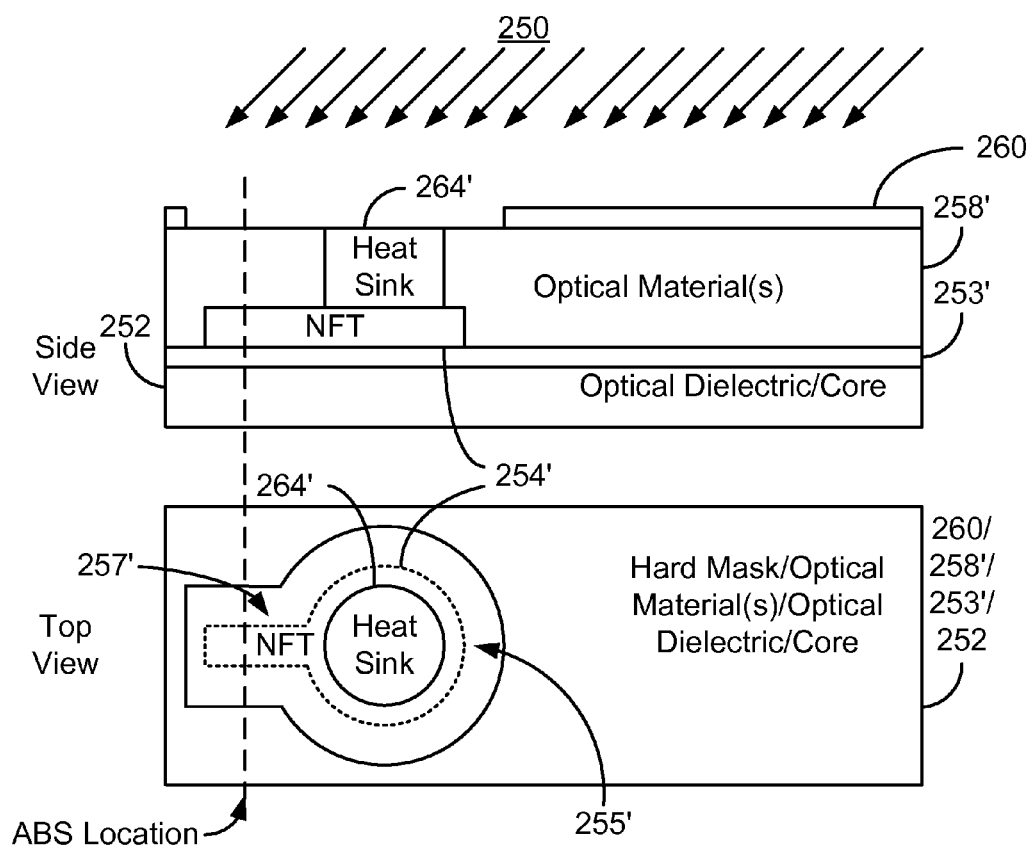

The excess heat sink material(s) 264 external to the aperture 262 are removed, via step 220. FIG. 13 depicts the EAMR transducer 250 as step 220 is performed. In the embodiment shown, a high angle ion mill is performed. Thus, the ion mill is performed at an angle from normal to the surface of the transducer 250. In another embodiment, a CMP or other planarization may then be performed. As a result, heat sink 264' remains. The bottom of the heat sink 264' is thermally coupled with the NFT 254'.

Figure 14:
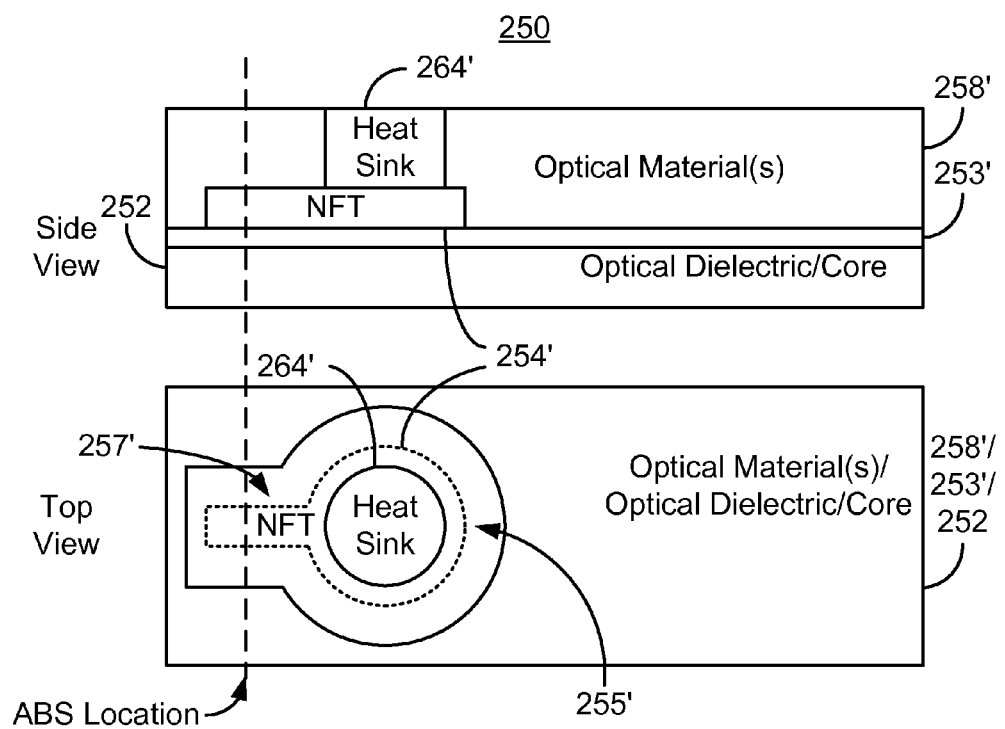

The hard mask 260 is then removed, via step 222. Step 222 may include performing an RIE appropriate for the material(s) used in the hard mask 260. For example, if the hard mask 260 is a SiC, then an SiC RIE may be used in step 222. FIG. 14 depicts the EAMR transducer 250 after step 222 is performed. Thus, the optical material(s) and heat sink 264' are shown.

Figure 15:
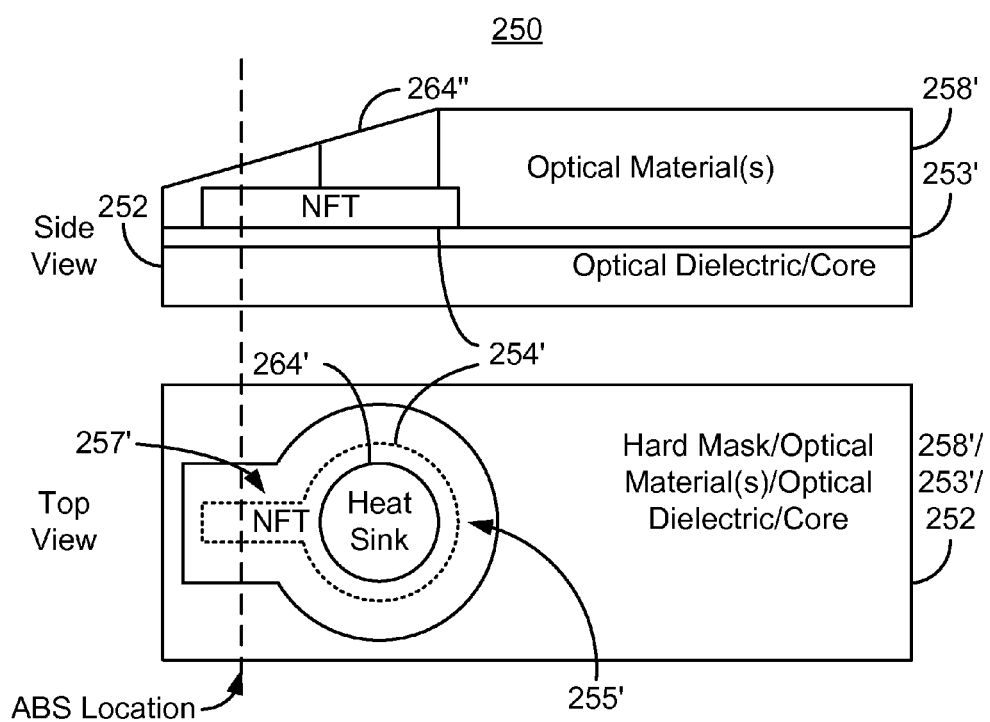

A portion of the heat sink is optionally removed, via step 224. Step 224 may be performed if, for example, the top surface of the heat sink is to be sloped, as shown in FIG. 3. Step 224 may include providing a mask covering at least a portion of the optical material(s) 258' and then ion milling the EAMR transducer at a milling angle. This milling angle corresponds to the angle desired for the top surface of the heat sink. For example, in some embodiments, the milling angle is at least twenty and not more than fifty degrees. In other embodiments, the desired milling angle is at least twenty and not more than forty-five degrees. In some embodiments, the taper angle for the heat sink 264 is at least twenty-seven and not more than thirty-three degrees. In other embodiments, other milling and taper angles may be used. FIG. 15 depicts the EAMR transducer 250 after step 224 is performed. Thus, the heat sink 264" having a sloped top surface is formed. As can be seen in FIG. 15, the bottom of the heat sink 264" is thermally coupled with the disk portion 255' of the NFT 254'. More specifically, the bottom of the heat sink 264" is in direct physical contact with the NFT. The top surface of the heat sink 264" is sloped.

A write pole configured to write to a region of the media is provided, via step 226. Step 226 includes depositing the high saturation magnetization pole materials and may include other steps. In some embodiments, for example as shown in FIG. 3, the pole tip would not have a flat portion in contact with the NFT 254'. In other embodiments, a portion of the pole tip may be in direct contact with the NFT 254'. In either case, the write pole has a bottom surface, in contact with the heat sink 264". A portion of the bottom surface of the pole is thermally coupled with the top surface of the heat sink 264". Coil(s) for energizing the write pole may be provided in step 228. Fabrication of the EAMR transducer may then be completed, via step 230.

Thus, using the method 200, the EAMR transducer 250 may be fabricated. The EAMR transducer has the desired geometry and heat dissipation. Further, the heat sink 264" may be self aligned with the disk portion 255' of the NFT 254'. The method 200 and EAMR transducer 250 share the benefits of the method 100 and the EAMR transducer 150. Consequently, manufacturing, reliability, and performance of the transducer 250 may be improved.

We claim:

1. A method for providing an energy assisted magnetic recording (EAMR) transducer coupled with a laser for providing energy and having an air-bearing surface (ABS) configured to face a media during use, the method comprising:
   providing a near-field transducer (NFT) using an NFT mask to cover the NFT during formation, a portion of the NFT residing at the ABS, the NFT for focusing the energy onto the region of the media;
   removing a portion of the NFT mask to form a heat sink mask covering a first portion of the NFT;
   depositing at least one optical material covering the heat sink mask and the NFT;
   removing the heat sink mask, thereby providing an aperture corresponding to a heat sink in the at least one optical material and exposing a second portion of the NFT;
   providing the heat sink having a top surface and a bottom thermally coupled with at least the second portion of the NFT, at least a portion of the heat sink residing in the aperture in the at least one optical material;
   providing a write pole configured to write to a region of the media, the write pole having a bottom surface, a portion of the bottom surface thermally coupled with the top surface of the heat sink; and
   providing at least one coil for energizing the write pole.

2. The method of claim 1 wherein the NFT has a disk portion and a pin portion, the heat sink mask covering at least part of the disk portion of the NFT.

3. The method of claim 2 wherein disk portion of the NFT has a circular cross-sectional shape.

4. The method of claim 2 wherein the step of removing the portion of the NFT mask further includes:
   shrinking the NFT mask.

5. The method of claim 4 wherein the step of shrinking the NFT mask further includes:
   performing an isotropic reactive ion etch (RIE).

6. The method of claim 5 wherein NFT mask includes a pin mask corresponding to the pin portion and a disk mask corresponding to the disk portion and wherein the step of performing the isotropic RIE removes the pin mask.

7. The method of claim 2 wherein the disk portion of the NFT has a cross-sectional shape, the heat sink mask has a heat sink cross-sectional shape, and the cross-sectional shape is substantially the same as the heat sink cross-sectional shape.

8. The method of claim 1 wherein the step of removing the heat sink mask further includes:
   providing a hard mask exposing at least a portion of the at least one optical material above the NFT;
   planarizing the transducer, thereby exposing the heat sink mask; and
   performing an etch configured to remove the heat sink mask.

9. The method of claim 8 wherein the heat sink mask is formed from at least a first material, the hard mask is formed from at least a second material different from the at least the first material.

10. The method of claim 1 wherein the step of providing the heat sink further includes:
    depositing at least one heat sink material; and
    removing a portion of the at least one heat sink material outside of the aperture.

11. The method of claim 10 wherein the step of removing the portion of the at least one heat sink material further includes:
    performing an ion mill at a milling angle that is greater than zero degrees from a normal to a top surface of the transducer.

12. The method of claim 10 wherein the step of removing the portion of the at least one heat sink material further includes:
    chemical mechanical planarizing the transducer.

13. The method of claim 1 wherein the heat sink includes at least one Au and Cu.

14. The method of claim 1 wherein the at least one optical material includes a material selected from aluminum oxide and silicon dioxide.

15. The method of claim 1 wherein the NFT mask includes at least one of SiC and amorphous carbon.

16. The method of claim 1 further comprising:
    removing a portion of at least the heat sink to provide the top surface at an angle with respect to the ABS, the angle being greater than zero and less than ninety degrees.

17. A method for providing an energy assisted magnetic recording (EAMR) transducer coupled with a laser for providing energy and having an air-bearing surface (ABS), the ABS configured to face a media during use, the method comprising:
    depositing a metallic layer on a portion of the EAMR transducer;
    providing a near-field transducer (NFT) mask on the metallic layer, the NFT mask being formed of at least one of SiC and amorphous carbon, the NFT mask including a disk region and a pin region between the disk region and the ABS;
    removing an exposed portion of the metallic layer exposed by the NFT mask to provide an NFT, the NFT for focusing the energy onto the region of the media and including a disk portion corresponding to the disk region of the NFT mask and a pin portion corresponding to the pin region of the NFT mask, the pin portion residing between the ABS and the disk portion;
    performing an isotropic reactive ion etch (RIE) to remove a portion of the NFT mask, thereby forming a heat sink mask from the NFT mask, the heat sink mask covering a first part of the disk portion of the NFT and exposing a second part of the disk portion of the NFT, the pin portion of the NFT mask being removed by the isotropic RIE;
    depositing at least one optical material covering the heat sink mask and the NFT;
    providing a hard mask exposing a portion of the at least one optical material above the NFT, the hard mask including at least one of SiC and amorphous carbon and being composed of a material different from the heat sink mask;
    chemical mechanical planarizing an additional portion of the EAMR transducer including the at least one optical material to expose the heat sink mask;
    performing an etch configured to remove the heat sink mask, thereby providing an aperture in the at least one optical material and exposing the first part of the disk portion of the NFT;
    depositing at least one heat sink material on the at least one optical material, a first portion of the at least one heat sink material residing in the aperture;
    removing a second portion of the at least one heat sink material outside of the aperture to form a heat sink post in the aperture, the heat sink post having a top surface and a bottom thermally coupled with the disk portion of the NFT;

removing the hard mask;

providing a write pole configured to write to a region of the media, the write pole having a bottom surface, a portion of the bottom surface thermally coupled with the top surface of the heat sink; and providing at least one coil for energizing the write pole.

18. The method of claim 17 further comprising:

removing a portion of at least the heat sink post to provide the top surface at an angle with respect to the ABS, the angle being greater than zero and less than ninety degrees.

* * * * *